Patented Oct. 19, 1954

2,692,201

UNITED STATES PATENT OFFICE 2,692,201

METHOD OF IMPROVING THE WHIPPING PROPERTIES OF GELATIN AND GELATIN CONTAINING PRODUCTS AND THE RESULTING PRODUCTS

Louis Johnson Conrad, Collingswood, and Henry Strahley Stiles, Merchantville, N. J., assignors to Kind & Knox Gelatin Company, a corporation of New Jersey No Drawing. Application September 5, 1952,
Serial No. 308,146

34 Claims. (Cl. 99—130)

This invention relates to a method of improving the whipping properties of gelatin and to the production of gelatin-containing products having improved properties as respects their ability to be used as whipping agents in producing such products as marshmallows and similar stable foam products. The invention also includes production of improved marshmallows and similar stable foam products.

Marshmallow is a foam, i. e., a colloid system in which a gas is dispersed in a liquid or semi-liquid, and kept in a more or less stable state by the presence of a third component which is commonly called the whipping agent.

The whipping agent concentrates at the liquid-gas interface and lowers the surface tension of the liquid. Thus gelatin, which is a common whipping agent, is added to sugar solutions or syrups to favor easy incorporation of air in small sized bubbles into the liquid as it is being whipped to increase the final volume of the marshmallow. In addition, as the air bubbles are formed, the gelatin forms a protective film around the bubbles.

Besides marshmallows, other whipped food products and many inedible industrial foams are prepared by using gelatin as the whipping agent. Various agents have been proposed as additions to gelatin or to marshmallow formulas and other food preparations to improve the whipping properties of the gelatin and increase the volume of the marshmallow from a given weight of starting material. Increased volume is often attractive to consumers and also reduces the volume cost of the product.

It is one of the principal objects of this invention to provide an improved whipping agent that will give greater volume per unit weight of foam as compared with gelatin used alone.

It is an additional object of this invention to provide a method of improving the whipping properties of gelatin without appreciably adversely affecting the viscosity or the jelly strength of the gelatin.

Other objects and advantages of the invention will be brought out in the ensuing detailed description and appended claims.

We have found that the whipping properties of gelatin may be very greatly improved without appreciably adversely affecting either the viscosity or the jelly strength of the gelatin, by associating therewith, either at a stage in the preparation of the gelatin whipping agent or at the time the gelatin is to be used as a whipping agent, a suitable proportion of an ester or a mixture of esters of a wide range of organic and inorganic acids, including among others esters of phosphoric acid and esters of organic acids. Organic acid esters that have been found to be especially suitable as addition agents in improving the whipping properties of gelatin include the esters of the aliphatic monocarboxylic acids and the acid esters and their salts and the neutral esters of the polycarboxy aliphatic acids, and among these are cited, by way of example, the mono- and di-alkyl acid esters of citric acid and their salts and the trialkyl esters of citric acid, the mono- and dialkyl esters of adipic acid, fumaric acid, maleic acid, malonic acid and tartaric acid; the alkyl esters of lactic acid, and the acetic acid esters of glycerol. Illustrative of the esters of phosphoric acid that may be used in practicing the invention are the mono- and dialkyl esters and their salts and the trialkyl esters and also the various glycerol esters of phosphoric acid.

The most effective range of proportions of these esters has been found to be from 0.5% to 3.0% of the esters based upon the dry weight of gelatin but benefits are obtained on either side of this range with most of the esters. Since gelatin is only a small percentage generally of a finished marshmallow or other foam product, the amount of ester in the finished foam is very minute, being generally less than 0.10%.

The chemical mechanism that brings about this improvement in whipping properties is not known but it may be due to alkylation of the gelatin by the esters or to the formation of complexes of the ester with the gelatin.

Gelatin is generally produced by extraction of cattle bones, hide pieces or porkskins. The raw material is pretreated by swelling in the presence of acid or alkali which leads subsequently to the well-known type A and type B gelatins, respectively. Either type, or mixtures of the types, may be used in practicing this invention. If the esters are added directly to the gelatin, there is little or no effect on the jelly strength and viscosity of the gelatin. The physical properties of the gelatins used in the examples are as follows:

| | Acid Precursor | Alkali Precursor |
|---|---|---|
| Jelly strength, g. (Bloom) | 236 | 233 |
| Viscosity at 60° C. (Millipoise) | 43.7 | 46.8 |
| pH of 1½% solution | 4.22 | 5.82 |

The following method was used as a constant procedure in testing many esters so that their effectiveness could be compared with each other:

A sugar solution of 200 g. 43° Baumé corn syrup, 120 g. sucrose, 80 g. dextrose and 60 g. distilled water were mixed together and brought into solution by heating at 75° C. in a water bath. A separate gelatin solution was made by soaking 10.4 g. of gelatin in a 60 g. distilled water solution of the particular ester to be tested containing sufficient 10% sodium citrate to adjust the pH to 5.0. This was dissolved at 40–45° C.

The sugar solution was cooled to 60° C. and the gelatin solution added thereto. After thorough stirring, 500 g. of this mixture was placed in a mixing bowl, cooled to 40° C. and maintained at that temperature in a constant temperature bath during the whipping period. The material was whipped with an electric mixer for 12 minutes at 142 R. P. M. At the end of the whipping period, the apparent density of the product was determined by weighing filled aluminum cups of known volume and then expressing the density in pounds per gallon.

The following examples show the effect of various esters on the marshmallow product, which was whipped as described above, but are not meant as limitations on this invention. The per cent of ester in the examples is always based on the dry weight of the gelatin.

In Table A the gelatin used was type A, i. e., from an acid precursor.

Table A

| Ex. No. | Amount, Percent | Ester | Apparent Density (Lbs. per gal.) |
|---|---|---|---|
| 1 | None | Control | 3.35 |
| 2 | 0.5 | Di-n-butyl acid pyrophosphate | 3.10 |
| 3 | 1.0 | Ethyl lactate | 3.14 |
| 4 | 1.0 | Ethyl adipate | 2.67 |
| 5 | 1.5 | Triethyl citrate | 2.69 |
| 6 | 1.5 | Triethyl phosphate | 2.56 |
| 7 | 1.5 | Mono-iso propyl acid orthophosphate | 3.08 |
| 8 | 1.5 | Ethyl aceto acetate | 2.85 |
| 9 | 1.5 | Diacetin | 3.14 |
| 10 | 1.5 | Monoacetin | 3.22 |
| 11 | 1.5 | Ethyl maleate | 2.67 |
| 12 | 1.5 | Ethyl malonate | 2.52 |
| 13 | 1.5 | Ethyl fumarate | 2.66 |
| 14 | 1.5 | Ethyl hydrogen adipate | 2.76 |
| 15 | 1.5 | Ethyl itaconate | 2.59 |
| 16 | 2.0 | Glycerol phosphoric acid | 3.13 |
| 17 | 2.0 | Ethyl tartrate | 2.88 |
| 18 | 2.0 | Sodium glycerol phosphate | 3.21 |
| 19 | 0.67 / 1.33 | Triethyl phosphate / Triethyl citrate | 2.55 |
| 20 | 1.00 / 1.00 | Triethyl phosphate / Triethyl citrate | 2.53 |
| 21 | 1.33 / 0.67 | Triethyl phosphate / Triethyl citrate | 2.51 |

In Table B samples of dried type A gelatin were reconstituted by dissolving in distilled water and then treated with the reported concentration of the ester. This was dried, ground and then tested according to the procedure described above.

Table B

| Ex. No. | Amount, Percent | Ester | Apparent Density (Lbs. per gal.) |
|---|---|---|---|
| 22 | 1.5 | Triethyl phosphate | 2.69 |
| 23 | 1.5 | Triethyl citrate | 2.74 |

In Table C, the type A gelatin was prepared without the ester and added to the sugar solution. Thereafter the ester was added directly to the resultant mixture.

Table C

| Ex. No. | Amount, Percent | Ester | Apparent Density (Lbs. per gal.) |
|---|---|---|---|
| 24 | 1.5 | Triethyl phosphate | 2.56 |
| 25 | 1.5 | Triethyl citrate | 2.78 |

In Table D, type B gelatin was used, i. e., from an alkaline precursor.

Table D

| Ex. No. | Amount, Percent | Ester | Apparent Density (Lbs. per gal.) |
|---|---|---|---|
| 26 | None | Control | 3.20 |
| 27 | 1.5 | Triethyl phosphate | 2.69 |
| 28 | 1.5 | Triethyl citrate | 2.83 |

In the above tests involving the use of type B gelatin, the same general procedure was followed as hereinbefore described except that no sodium citrate was added to the gelatin solution to adjust the pH. These gelatins were tested at a pH of 5.82.

The data set forth in the following table show the negligible effect of an ester on other properties of the gelatin:

Table E

| | Jelly Strength in Grams (Bloom) | Viscosity in Millipoises | pH |
|---|---|---|---|
| Gelatin Control (Acid precursor) | 233 | 41.8 | 4.23 |
| Gelatin with 1.5% triethyl citrate | 231 | 41.0 | 4.22 |

Improvement in the whipping properties of gelatin similar to the results set out above has been obtained with the use of mono isopropyl citrate containing a minor amount of the di- and tri-isopropyl citrates as impurities. Mono isopropyl citrate as commercially available for food purposes at this time is reported to consist of 90 per cent mono isopropyl citrate and 10 per cent di-isopropyl citrate. This product may be used for our purposes without further purification.

We claim:

1. The method of treating gelatin to improve the whipping properties thereof which comprises adding thereto an effective amount of an ester of an aliphatic carboxylic acid.

2. The method as defined in claim 1 wherein the ester is an alkyl ester of an aliphatic polycarboxylic acid.

3. The method as defined in claim 1 wherein the ester is a monoalkyl ester of an aliphatic polycarboxylic acid.

4. The method as defined in claim 1 wherein the ester is a dialkyl ester of an aliphatic tricarboxylic acid.

5. The method as defined in claim 1 wherein the ester is a trialkyl ester of an aliphatic tricarboxylic acid.

6. The method as defined in claim 1 wherein the ester component comprises triethyl citrate.

7. The method as defined in claim 1 wherein the ester component comprises ethyl maleate.

8. The method as defined in claim 1 wherein the ester component comprises mono isopropyl citrate.

9. The method as defined in claim 1 wherein the ester component comprises ethyl fumarate.

10. A method as defined in claim 1 wherein the ester component comprises an ester of an aliphatic carboxylic acid and an ester of phosphoric acid.

11. A method as defined in claim 1 wherein the ester component comprises triethyl citrate and triethyl phosphate.

12. A whipping agent comprising gelatin and an effective amount of an ester of an aliphatic carboxylic acid.

13. A whipping agent comprising gelatin and an effective amount of an alkyl ester of an aliphatic polycarboxylic acid.

14. A whipping agent comprising gelatin and an effective amount of a monoalkyl ester of an aliphatic polycarboxylic acid.

15. A whipping agent comprising gelatin and an effective amount of a dialkyl ester of an aliphatic tricarboxylic acid.

16. A whipping agent comprising gelatin and an effective amount of a trialkyl ester of an aliphatic tricarboxylic acid.

17. A whipping agent comprising gelatin and an effective amount of triethyl citrate.

18. A whipping agent comprising gelatin and an effective amount of ethyl maleate.

19. A whipping agent comprising gelatin and an effective amount of mono isopropyl citrate.

20. A whipping agent comprising gelatin and an effective amount of ethyl fumarate.

21. A whipping agent comprising gelatin and an effective amount of an ester of an aliphatic carboxylic acid and an ester of phosphoric acid.

22. A whipping agent comprising gelatin and an effective amount of triethyl citrate and triethyl phosphate.

23. A stabilized foam product having incorporated therein a gelatin and an effective amount of an ester of an aliphatic carboxylic acid.

24. A marshmallow product having incorporated therein a gelatin and an effective amount of an ester of an aliphatic carboxylic acid.

25. A marshmallow product having incorporated therein a gelatin and an effective amount of an alkyl ester of an aliphatic polycarboxylic acid.

26. A marshmallow product having incorporated therein a gelatin and an effective amount of a monoalkyl ester of an aliphatic polycarboxylic acid.

27. A marshmallow product having incorporated therein a gelatin and an effective amount of a dialkyl ester of an aliphatic tricarboxylic acid.

28. A marshmallow product having incorporated therein a gelatin and an effective amount of a trialkyl ester of an aliphatic tricarboxylic acid.

29. A marshmallow product having incorporated therein a gelatin and an effective amount of triethyl citrate.

30. A marshmallow product having incorporated therein a gelatin and an effective amount of ethyl maleate.

31. A marshmallow product having incorporated therein a gelatin and an effective amount of mono isopropyl citrate.

32. A marshmallow product having incorporated therein a gelatin and an effective amount of ethyl fumarate.

33. A marshmallow product having incorporated therein a gelatin and an effective amount of an ester of an aliphatic carboxylic acid and an ester of phosphoric acid.

34. A marshmallow product having incorporated therein a gelatin and an effective amount of triethyl citrate and triethyl phosphate.

References Cited in the file of this patent

UNITED STATES PATENTS

| Number | Name | Date |
| --- | --- | --- |
| 1,287,395 | Moore | Dec. 10, 1918 |
| 1,898,363 | Greenbank | Feb. 21, 1933 |
| 1,939,326 | Turnbow | Dec. 12, 1933 |
| 2,196,300 | Grettie | Apr. 9, 1940 |
| 2,477,539 | Grettie et al. | July 26, 1949 |